US006993180B2

(12) United States Patent
Sun et al.

(10) Patent No.: US 6,993,180 B2
(45) Date of Patent: Jan. 31, 2006

(54) METHOD AND SYSTEM FOR AUTOMATED GROUPING OF IMAGES

(75) Inventors: Zhaohui Sun, Rochester, NY (US); Alexander C. Loui, Penfield, NY (US)

(73) Assignee: Eastman Kodak Company, Rochester, NY (US)

(*) Notice: Subject to any disclaimer, the term of this patent is extended or adjusted under 35 U.S.C. 154(b) by 662 days.

(21) Appl. No.: 09/945,969

(22) Filed: Sep. 4, 2001

(65) Prior Publication Data

US 2003/0059107 A1    Mar. 27, 2003

(51) Int. Cl.
*G06K 9/00* (2006.01)

(52) U.S. Cl. .................. 382/165; 382/170; 382/224; 382/264; 382/298; 348/231.2; 707/104.1

(58) Field of Classification Search ................ 382/164, 382/165, 170, 173, 190, 194, 224, 264, 278, 382/279, 298, 299, 305, 30; 345/619; 707/6, 707/104.1; 348/231.2
See application file for complete search history.

(56) References Cited

U.S. PATENT DOCUMENTS

| | | | | |
|---|---|---|---|---|
| 5,495,538 | A | * | 2/1996 | Fan .......................... 382/233 |
| 5,852,823 | A | * | 12/1998 | De Bonet .................... 707/6 |
| 5,911,139 | A | | 6/1999 | Jain et al. .................... 707/3 |
| 5,963,670 | A | | 10/1999 | Lipson et al. ................ 382/224 |
| 6,246,790 | B1 | * | 6/2001 | Huang et al. ................ 382/162 |
| 6,278,446 | B1 | * | 8/2001 | Liou et al. ................... 345/700 |
| 6,285,995 | B1 | * | 9/2001 | Abdel-Mottaleb et al. ..... 707/3 |
| 6,751,343 | B1 | * | 6/2004 | Ferrell et al. ................ 382/145 |

OTHER PUBLICATIONS

Platt, "AutoAlbum: Clustering Digital Photographs using Probabilistic Model Merging," Proc. of Workshop on Content-based Access of Image and Video Libraries, Jun. 16, 2000, pp. 96-100.*
Huang et al., "An Automatic Hierarchical Image Classification Scheme," Proc. 6th ACM Int'l Conf. On Multimedia, Sep. 1998, pp. 219-228.*
U.S. Appl. No. 09/163,619, filed Sep. 30, 1998, Alexander C. Loui et al.
"An Automatic Hierarchical Image Classification Scheme" by Jing Huang, S. Ravi Kumar, Ramin Zabih. Proceedings of ACM Multimedia 1998.
"Automatic Image Event Segmentation and Quality Screening for Albuming Applications" by Alexander C. Loui and Andreas E. Savakis. Proceedings of IEEE ICME 2000.
"Discovering Recurrent Visual Semantics in Consumer Photographs" by Alejandro Jaimes, Ana B. Benitez, Shih-Fu Chang, and Alexander C. Loui. Proceedings of ICIP 2000.
"AutoAlbum: Clustering Digital Photographs using Probabilistic Model Merging"by John C. Platt. Proceedings of IEEE Workshop on Content-based Access of Image and Video Libraries, 2000.

* cited by examiner

*Primary Examiner*—Bhavesh M. Mehta
*Assistant Examiner*—Yubin Hung
(74) *Attorney, Agent, or Firm*—David M. Woods

(57) ABSTRACT

A method of automated content-based grouping of digital images without using auxiliary metadata and training data set, comprises the steps of computing a color correlogram from image pixel values for each of the digital images, grouping the color correlograms into groups within a hierarchical structure based on relative similarities of the color correlograms, and assigning the images to the groups based on the hierarchical structure of the color correlograms.

25 Claims, 6 Drawing Sheets

METHOD AND SYSTEM FOR AUTOMATED GROUPING OF IMAGES

FIELD OF THE INVENTION

The present invention relates to digital image processing and more particularly to methods and systems for automated image grouping and management.

BACKGROUND OF THE INVENTION

With the advance of digital technologies, especially as found in the Internet and in the digital camera, the use of pictures as a universal language is getting easier and more efficient. However, the number of digital images, including personal collections, is increasing exponentially. Therefore, there is a growing need for an effective and efficient organization of a collection of unsorted digital pictures into coherent and similar groups. Such organized pictures are easier to use, more efficient to browse and retrieve, and more effective to present and display, making picture taking more fun and enjoyable.

The wide variety of image organization schemes can be classified as supervised or unsupervised, content-based or non-content-based, fully automatic or semi-automatic.

Supervised image classification requires extensive training before classification can succeed. People have to provide a training set comprised of examples (images and their membership labels) so that the system can build up a decision tree. Given a test image outside of the training set, the system tries to assign an appropriate membership label to it. One of such schemes is reported in "An automatic hierarchical image classification scheme", *Proceedings of ACM Multimedia* 1998, in the names of J. Huang, S. R. Kumar and R. Zabih. The article teaches a supervised, content-based and fully automatic approach to image classification. However, supervised training requires a priori knowledge about the data set, which is not always available. And the performance depends on how well the training data sets match the upcoming unsorted images. The paper does not suggest how to classify images when such training data is not available.

Some schemes use auxiliary metadata attached to each digital image, such as the date and time of capture or temporal order of the pictures, for image grouping. Previous articles taking this approach include: "AutoAlbum: Clustering digital photographs using probabilistic model merging", *Proceedings of IEEE Workshop on Content-based Access of Image and Video Libraries*, 2000, in the name of John C. Platt; "Automatic image event segmmentation and quality screening for albuming applications", *Proceedings of IEEE ICME* 2000, in the names of A. Loui and A. Savakis; "Discovering recurrent visual semantics in consumer photographs", *Proceedings of ICIP* 2000, in the names of A. Jaimes, A. B. Benitez, S.-F. Chang and A. Loui; and commonly-assigned U.S. patent application Ser. No. 09/163,618, "A method for automatically classifying images into events", filed Sep. 30, 1998 in the names of A. Loui and E. Pavie. The problem is that these methods depend on the auxiliary metadata, which is not always available for all images.

Other schemes use a content-based approach to test image similarity. The content-based approach refers to methods that analyze the image content, such as spatial color distribution, texture, shape, location, geometry, etc. U.S. Pat. No. 6,246,790, "Image indexing using color correlograms", teaches a low-level feature color correlogram and how to use it for image indexing. A color correlogram is a three-dimensional graph or table indexed by color and distance between pixels showing how the spatial correlation of color changes with distance in an image. Each entry (i, j, k) in the table is the probability of finding a pixel of color $c_i$ at a selected distance k from a pixel of color $c_j$. In U.S. Pat. No. 6,246,790, which is incorporated herein by reference, the color correlogram has been shown to have better performance than a color histogram as a low-level feature. U.S. Pat. No. 5,963,670, "Method and apparatus for classifying and identifying images", teaches a system and methods to use relative relationships between image patches encoded in a global deformable template for image classification and identification. U.S. Pat. No. 5,911,139, "Visual image database search engine which allows for different schema", teaches a search engine for content-based search and retrieval of visual objects. U.S. Pat. No. 5,852,823, "Image classification and retrieval system using a query-by-example paradigm", teaches image retrieval by examples. The task addressed in the foregoing four patents is one of image retrieval, that is, finding similar images from an image database. The task is different than image grouping, i.e., organizing images into coherent and similar groups. Furthermore, U.S. Pat. No. 6,246,790 does not suggest the application of a color correlogram for semi-automatic image grouping, and does not address efficient manipulation of color correlograms.

While a fully manual approach is not of much interest due to the amount of time and effort needed to sort through the pictures, a fully automatic content-based approach is very challenging, if not impossible, to achieve mainly because of the involved subjectivity. Given the same set of pictures, people with different background knowledge, emphasis, focus, emotion and criteria may not come up with the exact same grouping results. However, there is strong evidence that people tend to put visually similar pictures and images of the same subjects taken at the same time and location in the same group.

There is a need therefore for an improved method and system for unsupervised, content-based and semi-automatic image grouping.

SUMMARY OF THE INVENTION

It is an object of the invention to provide a method and a system to automate content-based image grouping without using auxiliary metadata and supervised training.

It is another object of the invention to allow minimal user interaction for final touch up of the grouping results, by adjusting image membership, merging groups, creating a new group, and deleting an existing group, and therefore freeing users from boring and repetitive tasks and letting them concentrate on creative and personalized tasks.

It is another object of the invention to use the hierarchical grouping result for efficient and effective image browsing and rendering.

The present invention is directed to overcoming one or more of the problems set forth above. Briefly summarized, according to one aspect of the present invention, the invention resides in a method for automated grouping of digital images, comprising the steps of computing a color correlogram from image pixel values for each of the digital images, grouping the color correlograms into groups within a hierarchical structure based on relative similarities of the color correlograms, and assigning the images to the groups based on the hierarchical structure of the color correlograms. In addition, image membership may be optionally adjusted by user interaction.

From a user's point view at a high semantic level, the disclosed method can be described as follows. The initial N unsorted digital images are put into N different groups, one image in one group. We compare the spatial color distribution of the images in different groups and find the pair with the smallest visual difference. The pair is merged, and the images inside the group are aggregated as a single mosaic image. The newly formed image group contains one single composite image (the image size gets bigger now, and it is possible that images with different sizes are compared in the next step). The process of merging visually similar groups keeps going until it meets a stop criteria. Sometimes, it is desirable that we take one of the image subgroups and repeat the grouping again, yielding a hierarchical structure of the image groups. At any time, user interaction can be initiated to make necessary adjustment, making it a semi-automatic approach.

From a computer/machine's point of view at a low feature level, images are modeled by their feature vectors, the color correlograms, and the manipulation and operation on images is carried out on the corresponding feature vectors. The N vectors of color correlograms for N images are computed and each vector is fit into one group. The distances between pairs of the feature vectors are calculated and the pair with the smallest distance is combined appropriately. The grouping process repeats until it meets the stop criteria. Similarly, the feature vectors in the same subgroup can be further organized into different subgroups, yielding a hierarchical structure of low-level feature vectors. The operations of user interaction are also translated to those on the corresponding feature vectors.

The disclosed invention allows user interaction for final touch up of the grouping results by adjusting image membership, merging groups, creating a new group, or deleting an existing group. Therefore, the automated image grouping according to the invention frees users from boring and repetitive tasks and lets them concentrate on creative and personalized tasks.

The disclosed invention also enables efficient and effective image browsing and rendering based on the hierarchical grouping results. Users can browse a single image and its attribute, a group of images and their attributes, hierarchical structure of the image groups, etc.

ADVANTAGEOUS EFFECT OF THE INVENTION

The method according to the invention does not require the use of auxiliary metadata and supervised training. In addition, the method is effectively and efficiently implemented for a number of reasons, as follows:

1. A color correlogram of each image is computed only once. Efficient schemes are disclosed to manipulate only color correlograms in image grouping operations without referring back to image content.
2. The grouping result does not depend on the given order of the set of images. Reshuffling the input images does not change the final grouping result.
3. The grouping result does not depend on the size and orientation of the input images.
4. Users can always make a final touch up of the grouping result.
5. The method does not look into the details of the image content (like regions, blobs, edges, etc.), and therefore runs very fast.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system and method as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

The goal of the disclosed system is to sort a collection of unorganized digital images into coherent and visually similar groups in a hierarchical structure. An important aspect of this system is semi-automatic image grouping. A content-based approach to fully automatically classifying images is a challenging, if not impossible, task due to the subjectivity involved. This invention takes over the repetitive and boring tasks and lets the user concentrate on creative and personalized tasks by only making final adjustments through interaction. Another important aspect of the invention is that it is a content-based grouping method that does not use image metadata. Neither date and time information nor the temporal order information is needed. Therefore, the disclosed grouping method can always be used regardless of the availability of metadata. When the image metadata is available, the extra information can be easily incorporated into the disclosed image grouping method. Yet another aspect of the invention is that the approach taken is one of unsupervised clustering. It does not require any training and a priori knowledge of the characteristics of the image feature vectors.

Figure 1:
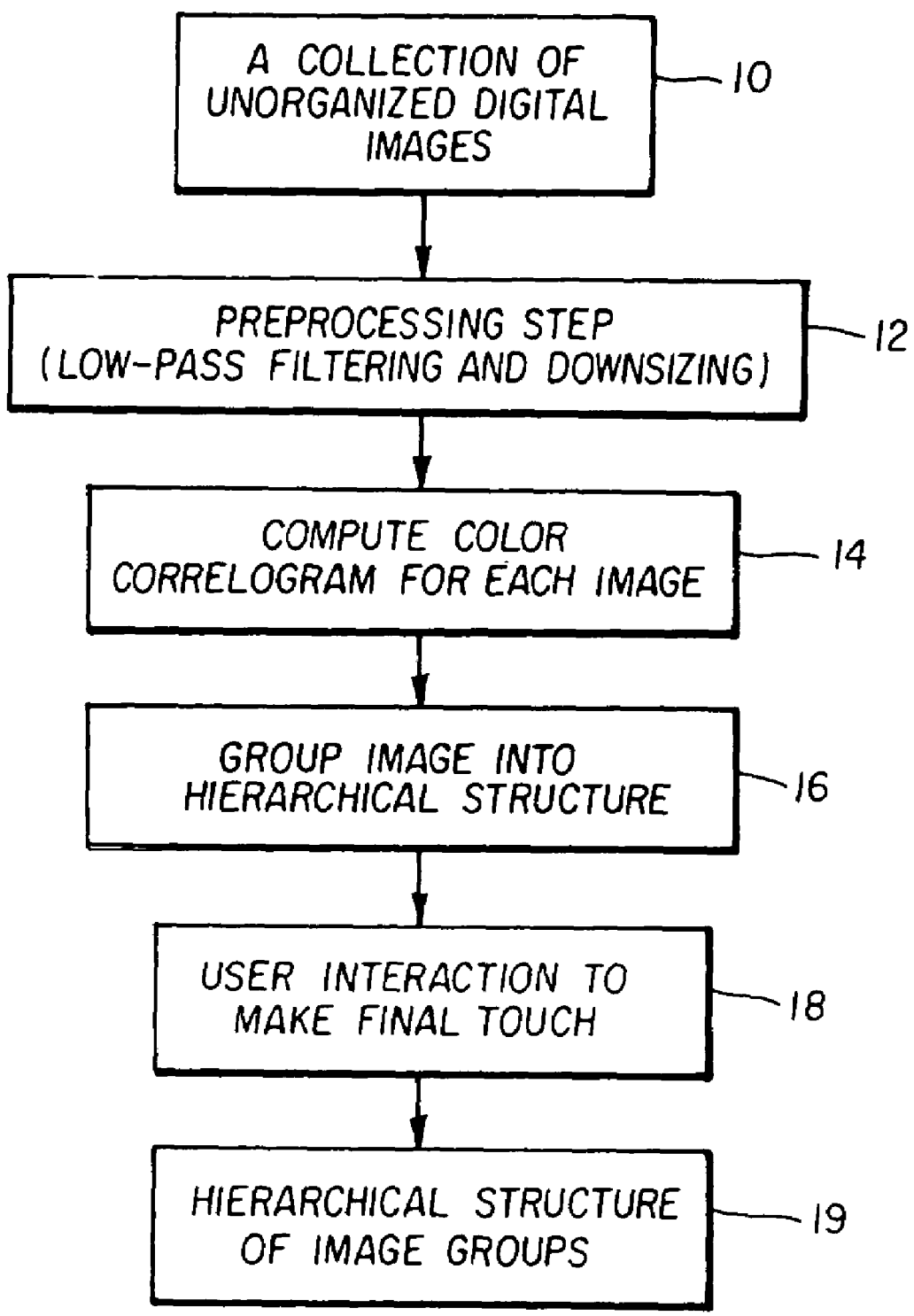
FIG. 1 is a block diagram of the disclosed automated and content-based image grouping system.

Referring first to FIG. 1, the disclosed image grouping system operates on a collection of unorganized digital images 10. The images are ordinarily typical consumer images, but there is no such requirement. The images may be from digital cameras or other image capture devices, or they may be from the Internet, other communication channels or a database, or they may be scanned from film or paper prints. The automated image grouping method is composed of four modules (only two of which are required), as follows:

A first (optional) module 12 for image preprocessing, removing image noise and downsizing the image data.

A second module 14 for computing a color correlogram for each individual image.

A third module 16 for grouping images into a hierarchical structure.

A fourth (optional) module 18 for manually adjusting the grouping result.

The first module 12 is optionally employed because image size and image noise are not important for visual similarity comparison. In addition, in the preprocessing step 12, downsizing can reduce computation cost, and removing image noise makes it easier to capture spatial color distribution.

A color correlogram $\Gamma_{ij}^k$ of image I is defined as:

$$\Gamma_{ij}^k(I) = \underset{p_1 \in I_i, p_j \in I_j}{prob} \{p_2 \in I_j \mid |p_1 - p_2| = k\}$$

i.e. the probability of two pixels, one with color $I_i$ and the other with color $I_j$, separated by a distance of k. When $I_i = I_j$, it is called as auto-correlogram, which indicates the probability of a pixel having a neighbor separated by a distance of k, with the same color. When only a finite set of distances k is chosen, it is simplified as a banded color correlogram.

The color correlogram $\Gamma_{ij}^k(I)$ of image I at step 14 can be computed based on the counts of color co-occurance $\gamma_{ij}^k(I)$ and the color histogram h(I), $$\Gamma_{ij}^k(I) = \frac{\gamma_{ij}^k(I)}{8k * h_i(I)},$$

where the color co-occurrence $\gamma_{ij}^k(I)$ is the count of two pixels $p_1$ and $p_2$ separated by a distance of k with colors $I_i$ and $I_j$, respectively $$\gamma_{ij}^k(I) = |\{p_1 \in I_i, p_2 \in I_j \| p_1 - p_2| = k\}|,$$

and the color histogram h(I) is a count of distribution indicating the number of pixels with specific color $$h_i(I) = n^2 \underset{p \in I}{prob} \{p \in I_i\}$$

where n is the number of total pixels in image I.

When two images I and J are merged together, as a group, a group color correlogram of the composite image (I+J) can be computed efficiently through the histograms and co-occurance of the two, i.e.

$$\Gamma_{ij}^k(I+J) = \frac{\gamma_{ij}^k(I) + \gamma_{ij}^k(J)}{8k(h_i(I) + h_i(J))} \qquad \text{Eq. (1)}$$

Equation (1) is important for this invention. Merging images is a fundamental operation in the disclosed image grouping algorithm. Equation (1) guarantees that we only need to compute the color correlogram once from image content (the pixel colors), and the operations of image grouping can be carried out by manipulation of the corresponding color correlograms, counts of histograms and co-occurance. This greatly simplifies the computation. When two groups of images are merged as one, only their representative correlograms are manipulated without referring to the pixel values in each image.

Module 16 groups images in hierarchical structure. This step is fully automatic and details will be explained in FIG. 2. The automation takes repetitive and boring tasks away from the user.

Module 18 enables user interaction, making the whole image grouping process semi-automatic. Unsupervised and content-based image classification is very challenging, if not impossible, because of the inherent subjectivity. Given the same set of pictures, people with different background knowledge, emphasis, focus, emotion and criteria may not come up with the exact same grouping results. By allowing minimal user interaction, the invention lets users make final touch up on the grouping results by, e.g., adjusting image membership, merging groups, creating a new group, and deleting an existing group. This step lets users concentrate on creative and personalized tasks so they always get what they want.

Figure 2:
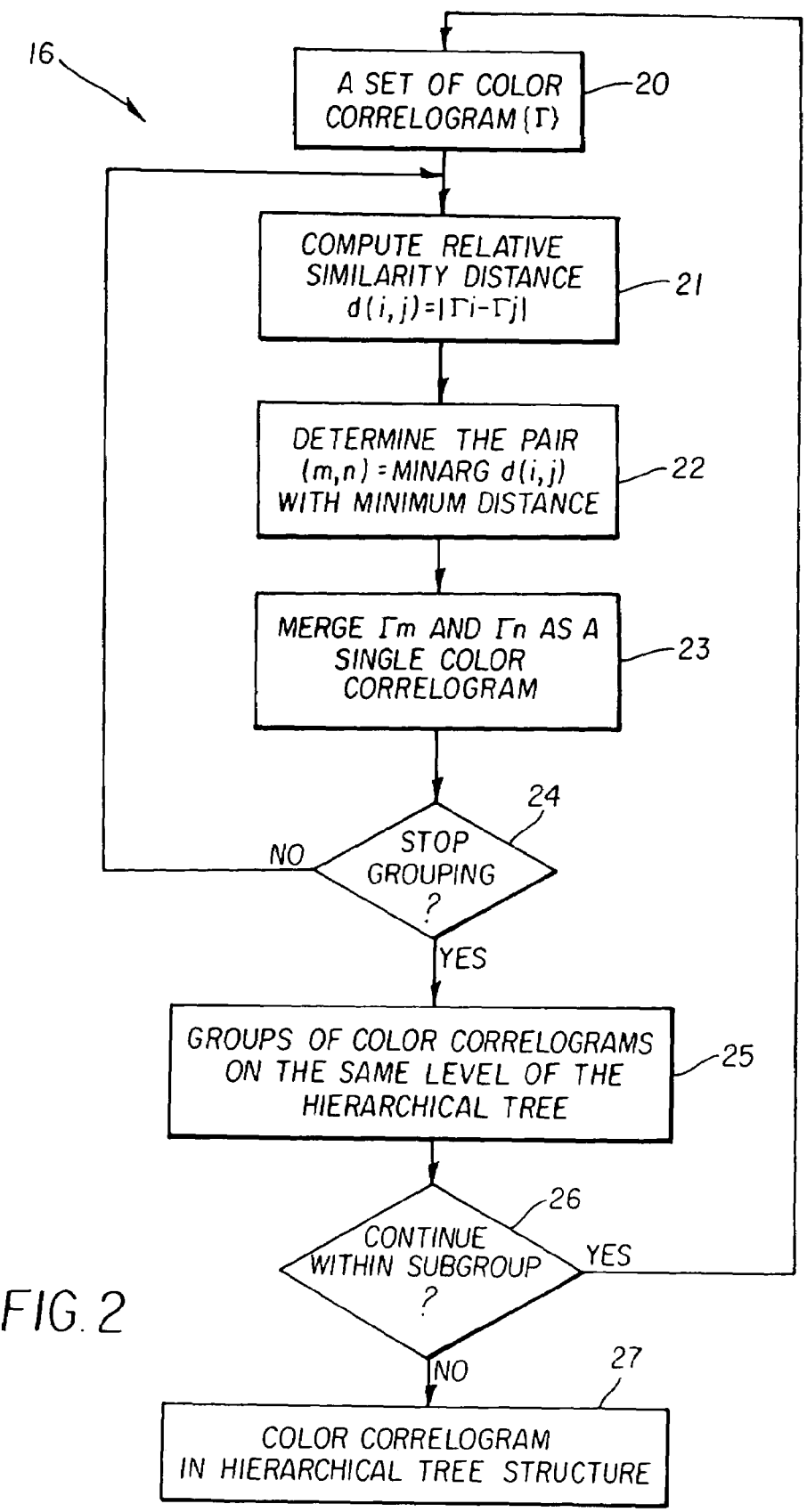
FIG. 2 is a block diagram of the disclosed method of grouping digital images, which includes the steps of: computing and grouping the color correlograms into a hierarchical structure, and assigning the image memberships.

Refer to FIG. 2 for the details of module 16. The step of grouping the color correlograms comprises the steps of determining the relative distance between each pair of correlograms, merging the pair of correlograms with the smallest relative distance into a group, forming a group correlogram representing the group, and repeating the steps of determining, merging and forming until a predetermined criterion is met. Module 20 is the input of a set of feature vectors (color correlograms), one for each image. Step 21 computes the L1 distance d(i,j) between any pair of feature vectors, as follows:

$$d(i,j) = |\Gamma i - \Gamma j|$$

where $\Gamma i$ and $\Gamma j$ are the correlograms of a pair of images. The distance indicates the relative similarity between images. Step 22 determines the pair {m} and {n} having the smallest distance, as follows:

Pair (m,n)=minarg d(i,j)

This pair is then merged as a group, {m}+{n}=>{m,n}, in step 23. The corresponding color correlogram is updated according to Eq. (1). The manipulation is based on the feature vectors without referring to the image pixel values. A decision is made at step 24 whether to continue or not. The pre-determined stop criteria can be (without limitation) a specified number of groups, the relative distance between correlograms representing groups, or a specified rule for the groups, such as no group represents a single image (or, alternatively, each group represents more than one image). The process returns to step 21, if the decision is to continue otherwise, the images have been automatically sorted into groups in module 25. Another decision is then made at step 26 whether to continue the grouping process for any of the subgroups. If the decision is yes, the color correlograms of the images in the subgroup are used as input for module 21 and the iteration continues. When the process stops, hierarchical structure of color correlograms is obtained in module 27. Accordingly, the images are also classified as hierarchical groups, i.e., the images are assigned to groups based on the hierarchical grouping of the color correlograms.

Figure 3:
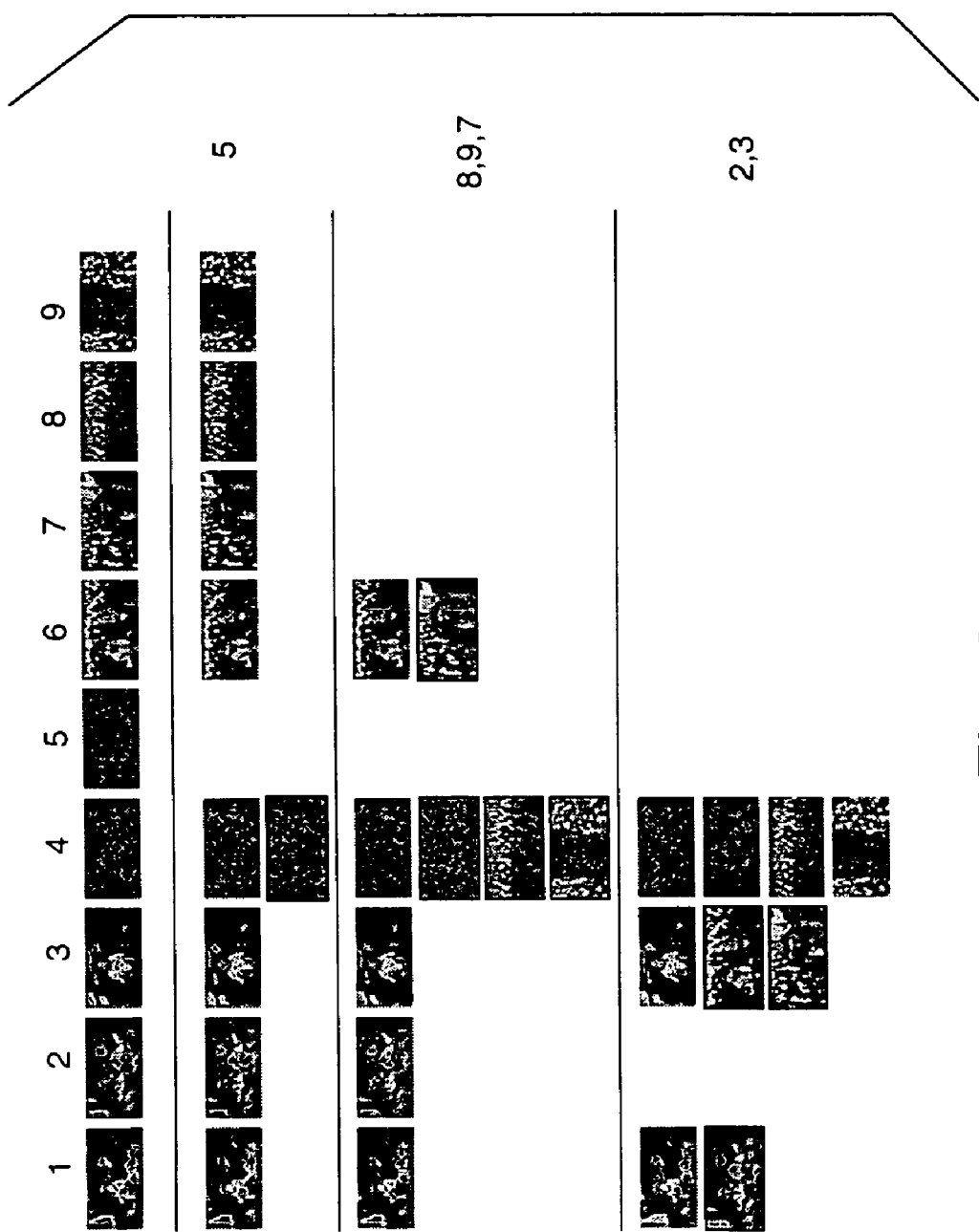
FIG. 3 illustrates the process of grouping digital images without using either auxiliary metadata or a training set.

Now refer to FIG. 3 for an illustration of how module 16 organizes images into groups. On the top, there are 9 unsorted 24 bits input color images (8 bits for red, green and blue respectively). The order of these images does not affect the final grouping results. The images are low-pass filtered and resized to 256 pixels along the maximum dimension while keeping the aspect ratio. The images are further quantized to 9 bits per pixels (3 bits for red, green and blue respectively). Banded color auto-correlograms with k=1,5,7 are extracted from the 9 images. These color correlograms serve as the unique signatures of the images, capturing spatial color distribution. Each color correlogram is represented as a feature vector with 1536 elements. At the beginning, each image is in a different group, $\{1\}, \{2\}, \ldots, \{9\}$. The 9 feature vectors are compared pairwise, and the pair with the smallest distance, at this step it is $\{4\}$ and $\{5\}$ (red flowerbed), are merged as a single composite image, i.e. $\{4\}+\{5\}=>\{4,5\}$, and the corresponding color correlogram is updated accordingly based on Eq. (1). The new feature vector captures the spatial color distribution for both images 4 and 5. After merging images 4 and 5, there are 8 groups left. In the next two iterations, images 8 and 9 are found to be closest to $\{4,5\}$ (flowerbed) and they are merged as a single group, $\{8\}+\{4,5\}=>\{4,5,8\}$ and $\{9\}+\{4,5,8\}=>\{4,5,8,9\}$, and the corresponding color correlogram is updated accordingly. This process continues until it meets the stop criteria (e.g. no group represents a single image) as images 6 and 7 are merged with image 3, $\{6\}+\{3\}=>\{3,6\}$, $\{7\}+\{3,6\}=>\{3,6,7\}$, and image 2 is merged with image 1, $\{2\}+\{1\}=>\{1,2\}$. Therefore, the algorithm has automatically classified 9 unsorted images into three groups based on their spatial color distribution, $\{1,2\}, \{3,6,7\}, \{4,5,8,9\}$. This grouping result is independent of the size, the orientation, and the initial order of the 9 images. In case the user thinks image 3 belongs to group $\{1,2\}$, adjustment can be made by dragging-and-dropping the thumbnail of image 3 into the group of $\{1,2\}$. The image membership and feature vectors are automatically updated, yielding new groups of $\{1,2,3\}, \{6,7\}$ and $\{4,5,8,9\}$. The user may also want to continue the image grouping in one of the subgroups, say $\{4,5,8,9\}$, to get finer classification and construct a hierarchical tree structure.

Figure 4:
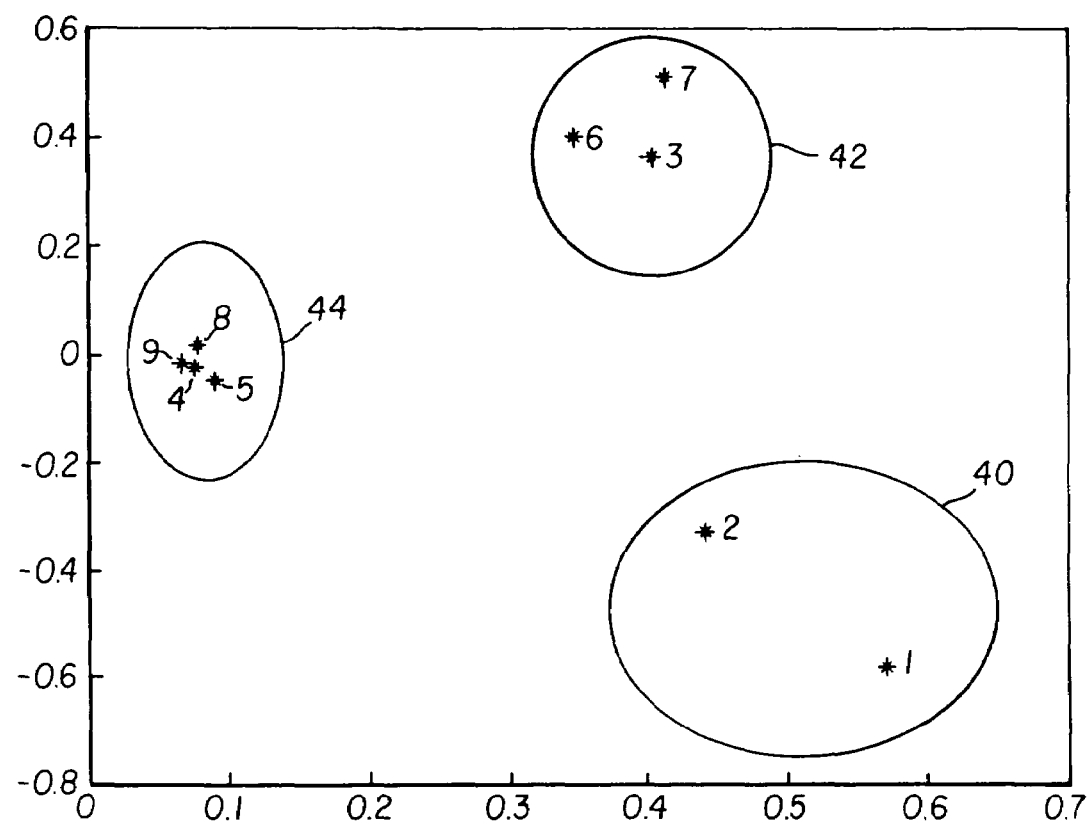
FIG. 4 illustrates the distribution and grouping of the two most dominant singular vectors for the images shown in FIG. 3.

Next refer to FIG. 4 for a graphical illustration of module 16 in eigenspace. It depicts the distribution of the first two dominant eigenvectors of the color correlograms for the 9 images shown in FIG. 3. The eigenvectors of the color correlograms are projected to eigenspace in FIG. 4, with x and y axes as the first and second most dominant eigenvectors. In the eigenspace, each image is modeled as a single point, and the distance between points is used to measure the visual similarity between images. In this particular example, the images can be automatically classified as three groups, $\{1,2\}$ (module 40), $\{3,6,7\}$ (module 42) and $\{4,5,8,9\}$ (module 44).

Figure 5:
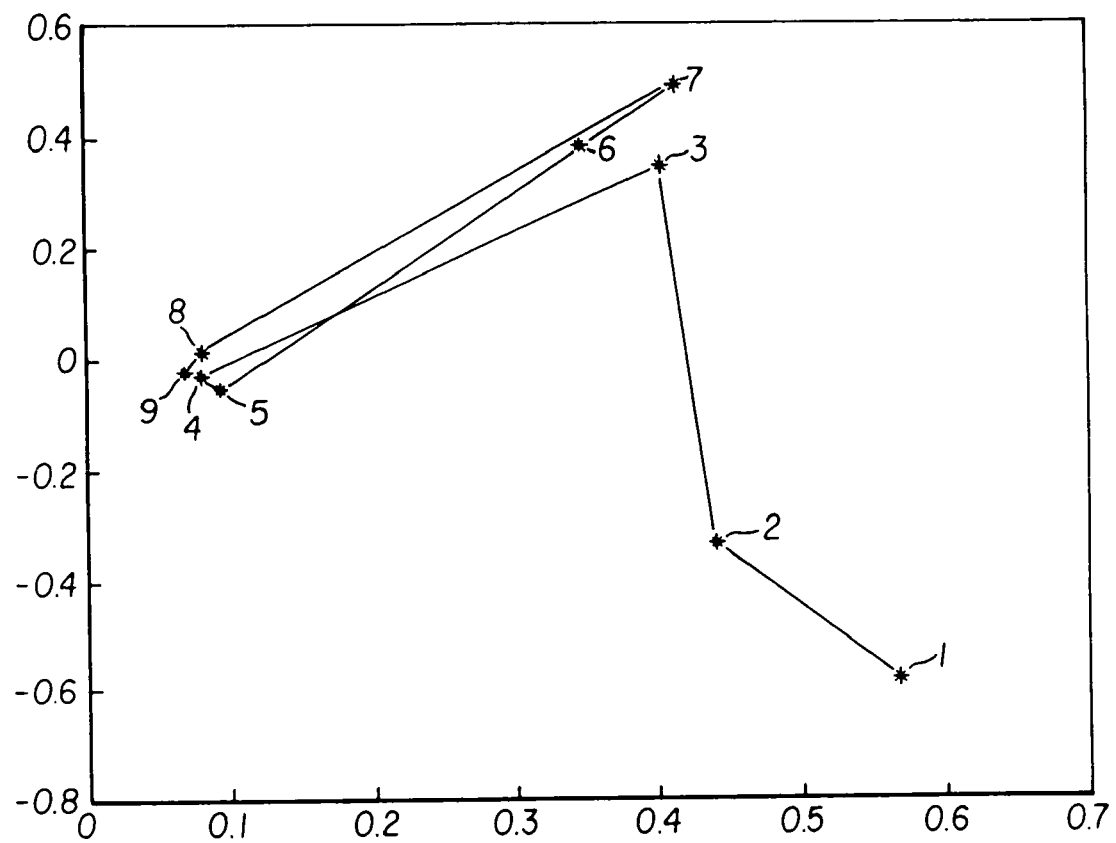
FIG. 5 illustrates the distribution and grouping of the two most dominant singular vectors for the images shown in FIG. 3 when the temporal order is also available.

When image metadata is also available, the extra information can be integrated into the disclosed image grouping algorithm. For example, FIG. 5 shows the same distribution of the eigenvectors for the 9 images when the temporal order of the images is given. In this case, image is taken one after another (this is true if the images are scanned from a roll of film). In eigenspace shown in FIG. 5, the problem of image grouping with temporal order degenerates to 1-D clustering problem. Every image is only compared and possibly merged with its temporal neighbors, the image taken before it and the image after it. For this particular example, four image groups are achieved after temporal image grouping, $\{1,2,3\}, \{4,5\}, \{6,7\}$, and $\{8,9\}$. This is different from the result of FIG. 3, because different constraints involved. Users can always make final adjustment through user interaction.

Figure 6:
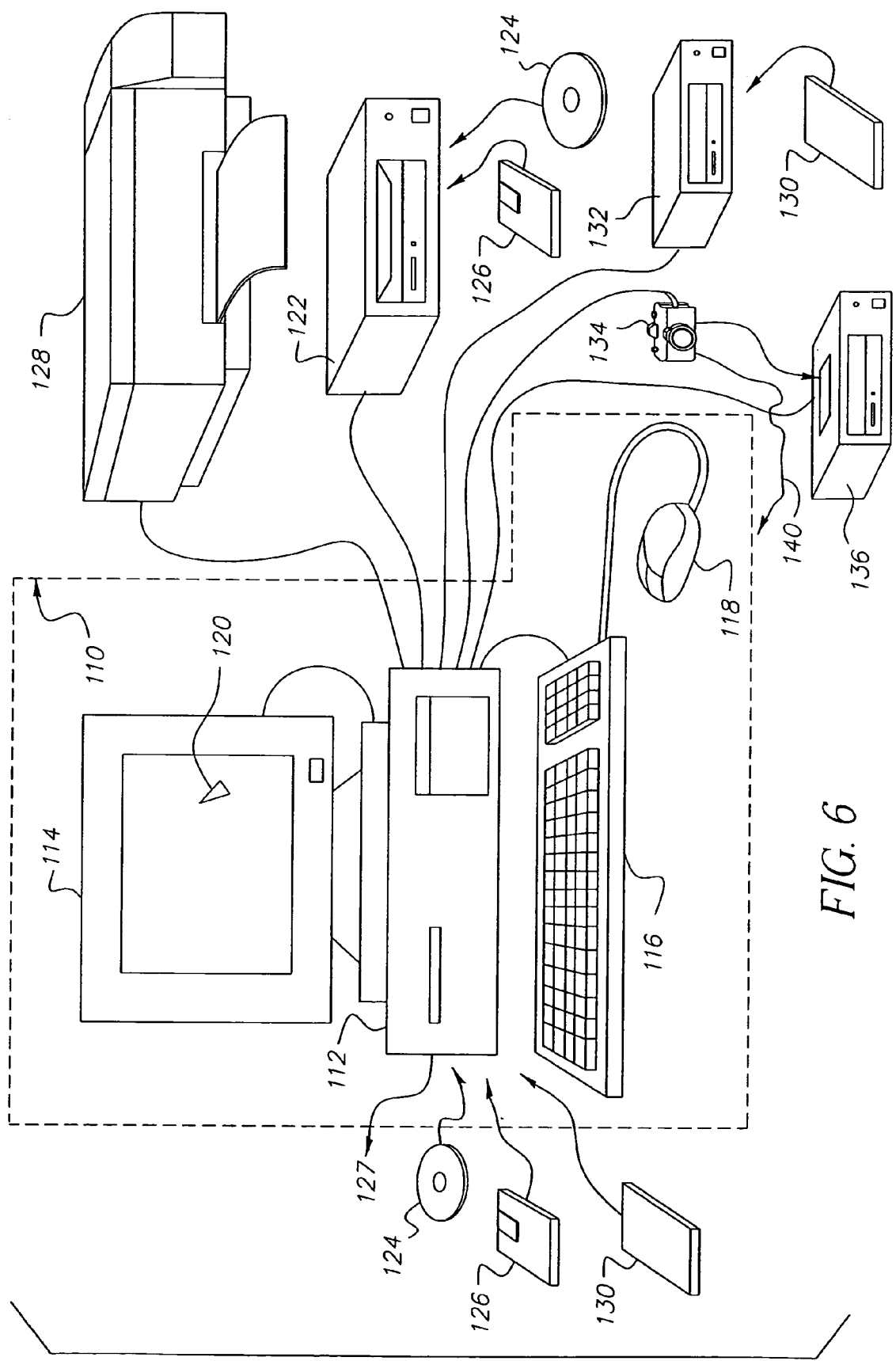
FIG. 6 is a perspective diagram of a computer system for implementing the present invention.

Referring to FIG. 6, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera 134 or a scanner 136 (for example, by scanning an original, such as a silver halide film). The digital camera 134 may also download images to the computer system through a communications link 140 (e.g., an RF or IR link). In accordance with the invention, the algorithm may be stored in any of the storage devices heretofore mentioned and applied to images in order to sort a collection of unorganized digital images into coherent and visually similar groups arranged in a hierarchical structure.

The invention has been described in detail with particular reference to certain preferred embodiments thereof, but it will be understood that variations and modifications can be effected within the spirit and scope of the invention.

PARTS LIST

| | |
|---|---|
| 10 | input unorganized digital color images |
| 12 | preprocessing step, including low-pass filtering and downsizing |
| 14 | compute color correlogram step |
| 16 | group images as hierarchical structure step |
| 18 | user interaction step |
| 19 | hierarchical structure of image groups |
| 20 | a set of color correlogram |
| 21 | compute distance of similarity step |
| 22 | determine the pair with the minimum distance step |
| 23 | merge two color correlograms together step |
| 24 | decide whether continue grouping or not step |
| 25 | groups of color correlograms on the same tree level |
| 26 | decide whether continue grouping inside subgroups step |
| 27 | groups of color correlograms in hierarchical structure |
| 40 | cluster 1 |
| 42 | cluster 2 |
| 44 | cluster 3 |
| 110 | computer system |
| 112 | microprocessor-based unit |
| 114 | display |
| 116 | keyboard |
| 118 | mouse |
| 120 | selector |
| 122 | CD-ROM |
| 124 | compact disk |
| 126 | floppy disk |
| 127 | network connection |
| 128 | printer |
| 130 | PC card |
| 132 | card reader |
| 134 | digital camera |
| 136 | scanner |
| 140 | communications link |

What is claimed is:

1. A method of automated grouping of digital images, comprising the steps of:
    a) computing a color correlogram from image pixel values for each of the digital images;
    b) grouping the color correlograms into groups within a hierarchical structure based on relative similarities of the color correlograms; and
    c) assigning the images to the groups based on the hierarchical structure of the color correlograms;
    wherein the step of grouping the color correlograms comprises the steps of:
    i) determining a relative distance between each pair of correlograms;
    ii) merging the pair of correlograms with the smallest relative distance into a merged group;
    iii) forming a correlogram representing the merged group; and
    iv) repeating the steps of determining, merging and forming until a predetermined criterion is met; and
    wherein the predetermined criterion requires that no group represents a single image.

2. The method claimed in claim 1, further comprising the step of low pass filtering and downsizing the digital images prior to the step of computing the color correlograms.

3. The method claimed in claim 1, further comprising the step of inspecting the hierarchical structure and manually effecting one or more operations on the groups.

4. The method claimed in claim 3, wherein the operations manually effected on the groups include one or more of adjusting membership of the groups, manually merging one or more of the groups, deleting one or more of the groups and assigning the images to another group, or manually creating one or more new groups.

5. The method claimed in claim 1, further comprising the step of browsing the images using the hierarchical structure.

6. The method claimed in claim 1, further comprising the step of determining the relative distance between one or more temporally adjacent pairs of correlograms if data identifying a temporal order of the images is also available.

7. The method claimed in claim 1, further comprising the step of determining the relative distance between one or more temporally adjacent pairs of correlograms if data identifying date and time of image capture is also available.

8. The method claimed in claim 1, wherein said group correlogram is computed from the corresponding color correlograms of the merged images without processing the image pixel values themselves.

9. The method claimed in claim 1, wherein the step of grouping the color correlograms into a hierarchical structure includes making adjustments on the image groups, such as adding a new group, removing an existing group, or changing image membership, which adjustments are carried out by manipulating the corresponding image color correlogram without referring back to the image pixel values or any other form of image content.

10. The method claimed in claim 1, wherein said grouping further comprises merging color correlograms within respective said groups.

11. The method of claim 1 wherein the predetermined criterion requires that each of said groups represents more than one image.

12. A computer program product for automatically grouping a plurality of digital images comprising: a computer readable storage medium having a computer program stored thereon for performing the steps of:
    a) computing a color correlogram from image pixel values for each of the digital images;
    b) grouping the color correlograms into groups within a hierarchical structure based on relative similarities of the color correlograms; and
    c) assigning the images to the groups based on the hierarchical structure of the color correlograms;
    wherein the step of grouping the color correlograms comprises the steps of:
    i) determining a relative distance between each pair of correlograms;
    ii) merging the pair of correlograms with the smallest relative distance into a merged group;
    iii) forming a correlogram representing the merged group; and iv) repeating the steps of determining, merging and forming until a predetermined criterion is met; and wherein the predetermined criterion requires that no group represents a single image.

13. The computer program product claimed in claim 12, further comprising the step of low pass filtering and downsizing the digital images prior to the step of computing the color correlograms.

14. The computer program product claimed in claim 12, further comprising the step of determining the relative distance between one or more temporally adjacent pairs of correlograms if data identifying a temporal order of the images is also available.

15. The computer program product claimed in claim 12, further comprising the step of determining the relative distance between one or more temporally adjacent pairs of correlograms if data identifying date and time of image capture is also available.

16. The computer program product of claim 12 wherein the predetermined criterion requires that each of said groups represents more than one image.

17. A system for automatically grouping a plurality of digital images comprising:

an input module for accessing a collection of unorganized digital images; and a digital processor including a computation module for computing a color correlogram from image pixel values for each of the digital images, a grouping module for grouping the color correlograms into groups within a hierarchical structure based on relative similarities of the color correlograms, and an assignment module for assigning the images to the groups based on the hierarchical structure of the color correlograms;

wherein the grouping module comprises:

means for determining a relative distance between each pair of correlograms;

means for merging the pair of correlograms with the smallest relative distance into a merged group;

means for forming a correlogram representing the merged group; and means for repeating the determining, merging and forming until a predetermined criterion is met; and wherein the predetermined criterion requires that no group represents a single image.

18. The system claimed in claim 17, further comprising a module for low pass filtering and downsizing the digital images prior to the step of computing the color correlograms.

19. The system claimed in claim 17, further comprising a user interface for inspecting the hierarchical structure and manually effecting one or more manual operations on the groups.

20. The system of claim 17 wherein the predetermined criterion requires that each of said groups represents more than one image.

21. A method of automated grouping of digital images, comprising the steps of:

a) computing a color correlogram from image pixel values for each of the digital images;

b) grouping the color correlograms into groups within a hierarchical structure based on relative similarities of the color correlograms; and c) assigning the images to the groups based on the hierarchical structure of the color correlograms;

wherein the step of grouping the color correlograms further comprises merging color correlograms within respective said groups until a predetermined criterion is met, said predetermined criterion being that none of said groups represents a single image.

22. The method of claim 21 wherein said merging is without processing the image pixel values themselves.

23. The method claimed in claim 21, wherein the step of grouping the color correlograms into a hierarchical structure includes making adjustments on the image groups, such as adding a new group, removing an existing group, or changing image membership, which adjustments are carried out by manipulating the corresponding image color correlogram without referring back to the image pixel values or any other form of image content.

24. A method of automated grouping of digital images, comprising the steps of:

a) computing a color correlogram from image pixel values for each of the digital images;

b) grouping the color correlograms into groups within a hierarchical structure based on relative similarities of the color correlograms; and c) assigning the images to the groups based on the hierarchical structure of the color correlograms;

wherein the step of grouping the color correlograms further comprises merging color correlograms within respective said groups until a predetermined criterion is met, said predetermined criterion being that each of said groups represents more than one image.

25. The method claimed in claim 24, wherein the step of grouping the color correlograms into a hierarchical structure includes making adjustments on the image groups, such as adding a new group, removing an existing group, or changing image membership, which adjustments are carried out by manipulating the corresponding image color correlogram without referring back to the image pixel values or any other form of image content.

* * * * *